(12) United States Patent
Russ

(10) Patent No.: US 9,115,799 B2
(45) Date of Patent: Aug. 25, 2015

(54) COMPACT GEARBOX FOR RAM AIR TURBINE OIL MANAGEMENT

(75) Inventor: David Everett Russ, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 714 days.

(21) Appl. No.: 13/430,890

(22) Filed: Mar. 27, 2012

(65) Prior Publication Data
US 2013/0259648 A1  Oct. 3, 2013

(51) Int. Cl.
*B64D 41/00*  (2006.01)
*F16H 57/04*  (2010.01)

(52) U.S. Cl.
CPC ........ *F16H 57/0443* (2013.01); *F16H 57/0452* (2013.01); *F16H 57/0495* (2013.01); *B64D 41/007* (2013.01); *Y10T 29/4932* (2015.01); *Y10T 74/2186* (2015.01)

(58) Field of Classification Search
CPC ............ F16H 57/0443; F16H 57/0452; F16H 57/0495; B64D 41/007
USPC ................................. 415/122.1, 142; 416/142
See application file for complete search history.

(56) References Cited

U.S. PATENT DOCUMENTS

| | | | | |
|---|---|---|---|---|
| 3,942,387 A * | 3/1976 | Stone et al. | ..................... | 74/417 |
| 4,742,976 A | 5/1988 | Cohen | | |
| 4,991,796 A | 2/1991 | Peters et al. | | |
| 5,122,036 A | 6/1992 | Dickes et al. | | |
| 5,145,324 A | 9/1992 | Dickes et al. | | |
| 5,174,719 A * | 12/1992 | Walsh et al. | .................. | 416/142 |
| 5,487,645 A | 1/1996 | Eccles | | |
| 5,564,903 A | 10/1996 | Eccles et al. | | |
| 6,331,099 B1 | 12/2001 | Eccles et al. | | |
| 6,580,179 B2 | 6/2003 | Eccles et al. | | |
| 6,676,379 B2 | 1/2004 | Eccles et al. | | |
| 7,077,631 B2 | 7/2006 | Eccles et al. | | |
| 7,708,527 B2 | 5/2010 | Eccles et al. | | |
| 2003/0011198 A1* | 1/2003 | Eccles et al. | ..................... | 290/44 |
| 2007/0160460 A1* | 7/2007 | Eccles et al. | .............. | 415/122.1 |
| 2011/0236218 A1 | 9/2011 | Russ et al. | | |
| 2012/0011953 A1* | 1/2012 | Bortoli | ........................ | 74/412 R |

* cited by examiner

*Primary Examiner* — Liam McDowell
(74) *Attorney, Agent, or Firm* — Carlson, Gaskey & Olds, P.C.

(57) ABSTRACT

A ram air turbine gearbox housing includes a housing body that has a first flange that defines a first plane and a second flange that defines a second plane that is transverse to the first plane. The housing body extends around an axis and has a first axial end and an opposite, second axial end that are each open to an internal cavity of the housing body. The housing body includes a radially-enlarged section at least partially defining an oil sump within the internal cavity of the housing body.

20 Claims, 6 Drawing Sheets

US 9,115,799 B2

COMPACT GEARBOX FOR RAM AIR TURBINE OIL MANAGEMENT

BACKGROUND

This disclosure generally relates to a ram air turbine that is utilized to provide emergency or supplemental power for an aircraft. More particularly, this disclosure relates to a gearbox of a ram air turbine.

A ram air turbine generally includes a turbine that is coupled through a gearbox to drive a generator. The ram air turbine is used to generate emergency or supplemental power in an aircraft by extracting power from an air stream along the exterior of the aircraft during flight. When the ram air turbine is not in use, it is stowed within the aircraft. When there is a desire for emergency or supplemental power, the ram air turbine is deployed from the stowed position to an operational position that provides clearance between the turbine and the aircraft.

The size of the ram air turbine of a given aircraft is typically constrained to a predetermined size envelope. Additionally, there are operational constraints that require that oil in the gearbox not be in contact with the gear when the ram air turbine is in the stowed position. The size and operational constraints present considerable challenges when designing a ram air turbine that functions properly.

SUMMARY

A ram air turbine gearbox housing according to one aspect of the present disclosure includes a housing body that has a first flange that defines a first plane and a second flange that defines a second plane that is transverse to the first plane. The housing body extends around an axis and has a first axial end and an opposite, second axial end that are each open to an internal cavity of the housing body. The housing body includes a radially-enlarged section at least partially defining an oil sump within the internal cavity of the housing body.

A ram air turbine gearbox according to one aspect of the present disclosure includes a housing body that has a first flange defining a first plane and a second flange defining a second plane that is transverse to the first plane. The housing body extends around an axis and has a first axial end and an opposite, second axial end that are each open to an internal cavity of the housing body. The housing body includes a radially-enlarged section at least partially defining an oil sump within the internal cavity of the housing body. At least one gear is mounted within the housing body.

A ram air turbine according to one aspect of the present disclosure includes a generator section, a turbine section that is movable between a deployed position and a stowed position, and a gearbox that is coupled to the turbine section such that the turbine section is operable to drive the generator section through the gearbox. The gearbox includes a housing body that has a first flange defining a first plane and a second flange defining a second plane that is transverse to the first plane. The housing body extends around an axis and has a first axial end and an opposite, second axial end that are each open to an internal cavity of the housing body. The housing body includes a radially-enlarged section at least partially defining an oil sump within the internal cavity of the housing body.

A cover for a gearbox of a ram air turbine according to one aspect of the present disclosure includes an annular body that extends around a central opening and between a first axial side and a second axial side with regard to a central axis of the opening. The annular body includes a lip that extends from the first axial side to a free tip end to define an axial lip dimension. The axial lip dimension varies with respect to circumferential position around the central axis.

A method of installing a gearbox on a ram air turbine according to one aspect of the present disclosure includes providing a gearbox that has a housing body as described in the above non-limiting examples, securing the housing body to a turbine section, and securing the second flange to at least one of a strut and a generator section.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION OF THE PREFERRED EMBODIMENT

Figure 1:
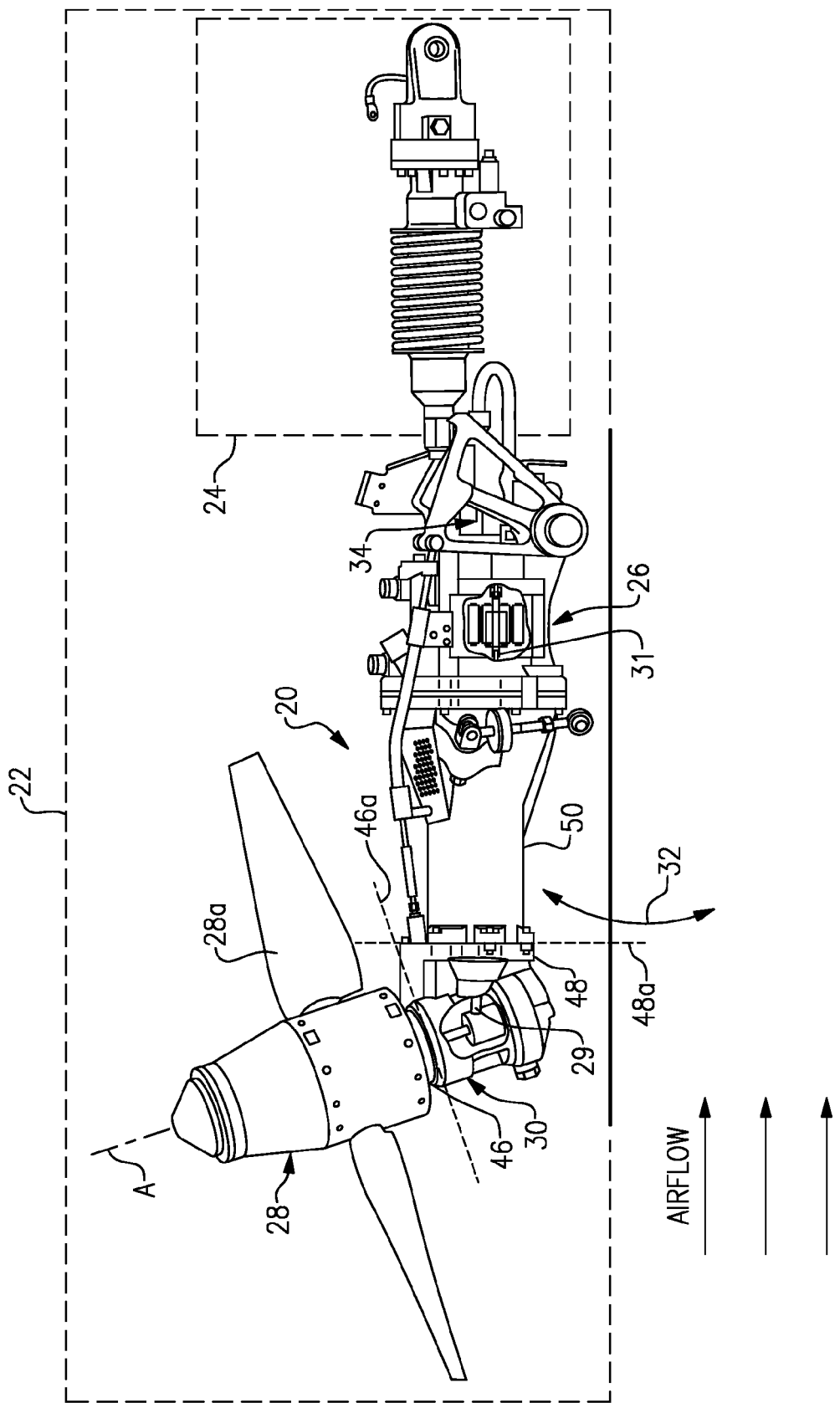
FIG. 1 illustrates an example aircraft and ram air turbine.

FIG. 1 illustrates an example ram air turbine 20, which is shown in a stowed position within an aircraft 22 (shown schematically). The ram air turbine 20 is generally mounted to an airframe 24 (also shown schematically) of the aircraft 22 in a known manner. In general, the ram air turbine 20 includes a generator section 26, a turbine section 28 having turbine blades 28a and a gearbox 30 that is coupled to the turbine section 28 such that the turbine section 28 is operable to drive the generator section 26 through the gearbox 30.

The ram air turbine 20 is stowed within the aircraft 22 when the ram air turbine 20 is not in use. When there is a desire for emergency or supplemental power, the ram air turbine 20 is deployed, as indicated by line 32, to a deployed, operational position within an airflow along the exterior of the aircraft 22. The airflow drives the turbine section 28, which rotates a turbine shaft 29. The turbine shaft 29 is coupled through the gearbox 30 with a driveshaft 31. The driveshaft is coupled to drive the generator section 26. In this example, the driveshaft is also coupled to drive a hydraulic pump 34. It is to be understood that the ram air turbine 20 is not limited to the arrangement shown, and that the teachings disclosed herein may be applied to other ram air turbine arrangements.

Figure 2A:
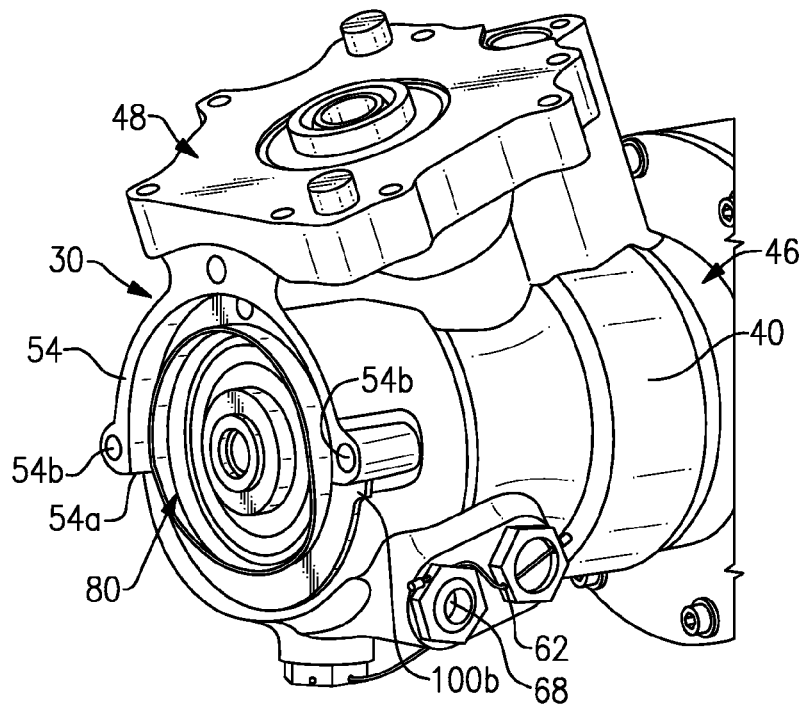
FIG. 2A illustrates a perspective view of a gearbox of a ram air turbine.
Figure 2B:
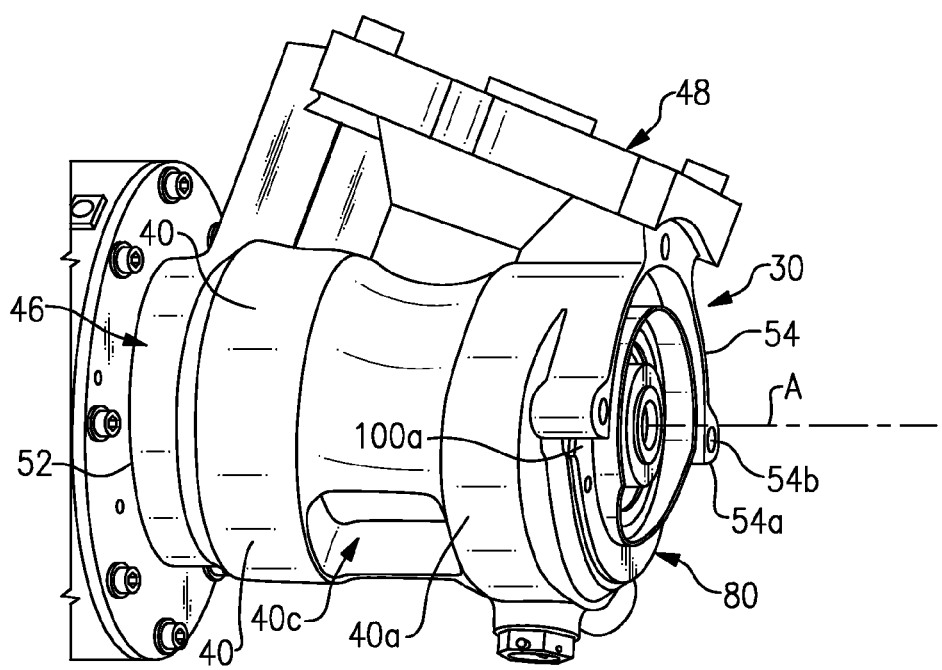
FIG. 2B illustrates another perspective view of the gearbox of the ram air turbine.
Figure 2C:
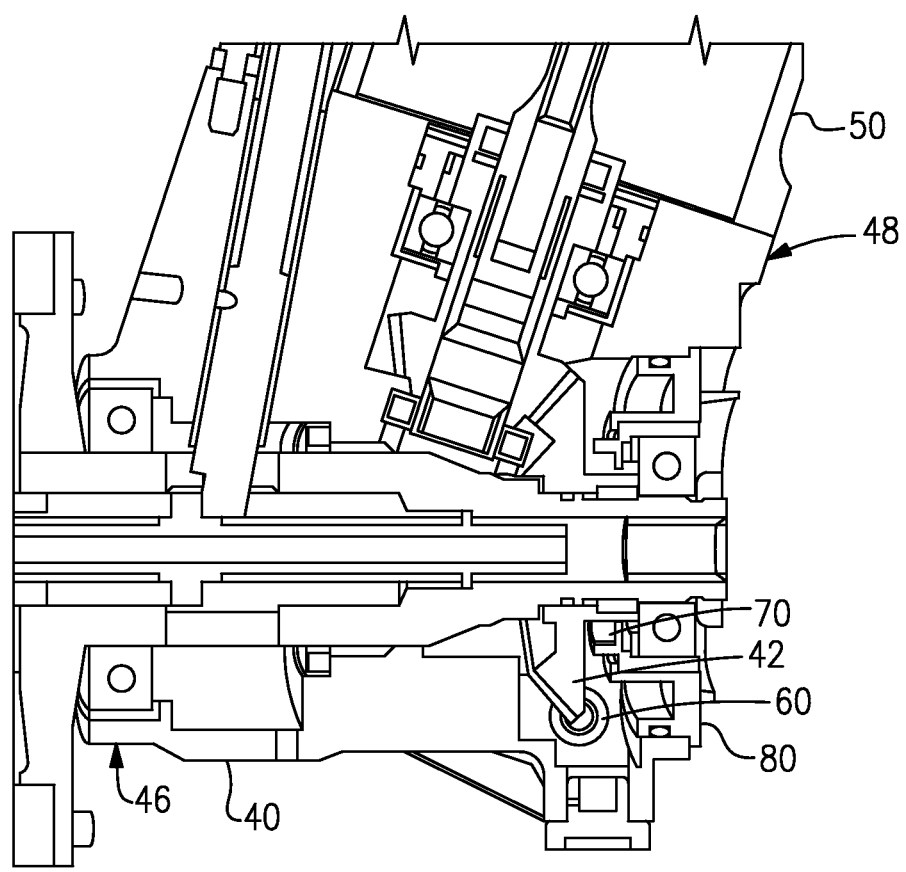
FIG. 2C illustrates a cross-section of the gearbox of the ram air turbine.
Figure 3B:
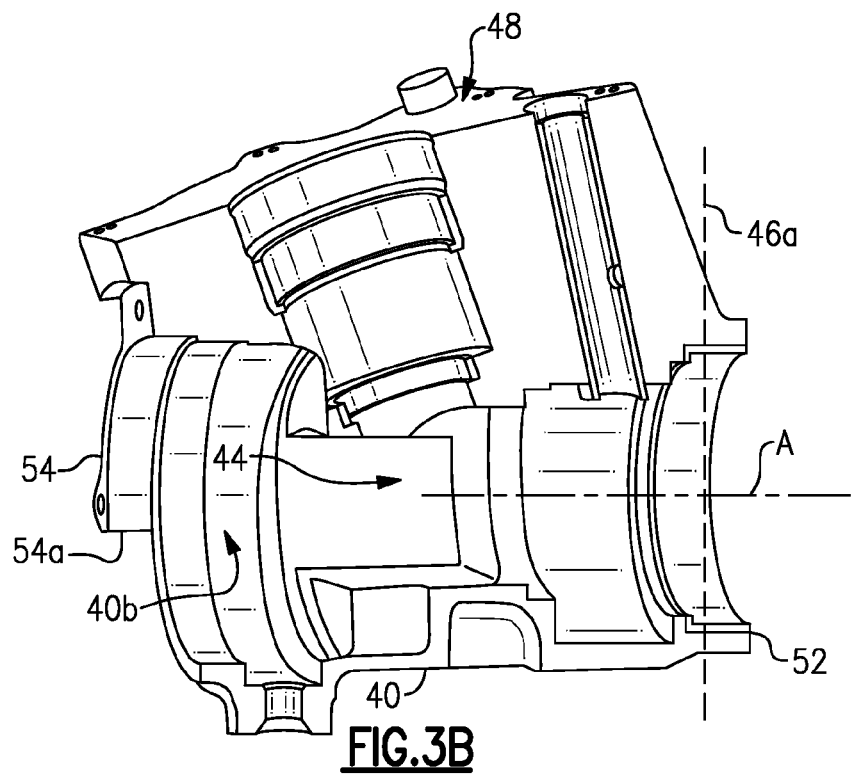
FIG. 3B illustrates a sectioned view of the housing body of FIG. 3A.
Figure 3A:
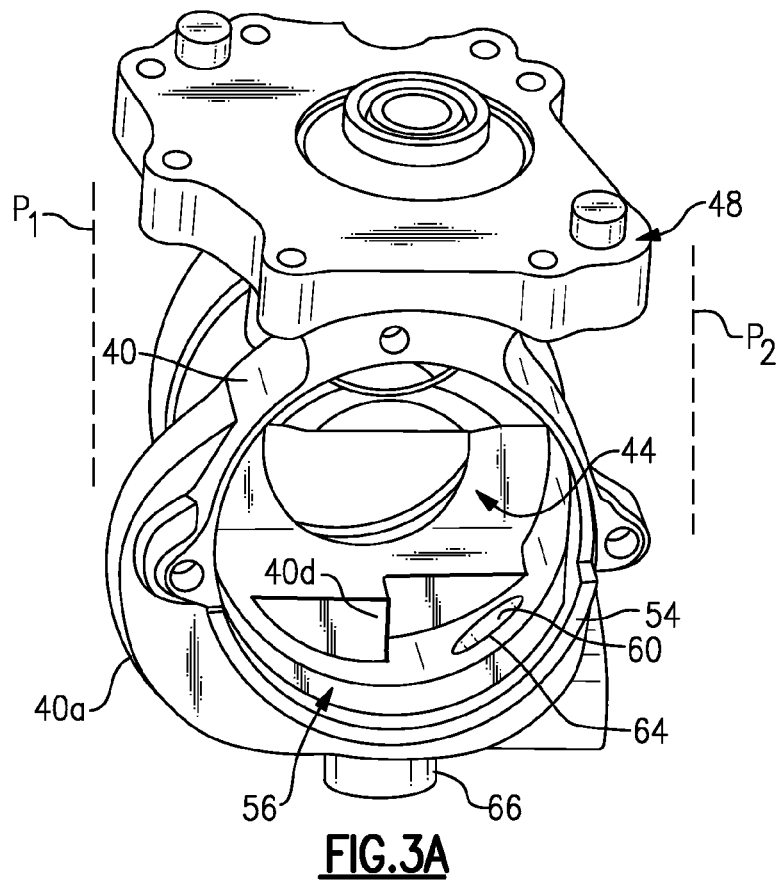
FIG. 3A illustrates a perspective view of a housing body of a gearbox.

The following description is made with reference to FIGS. 2A and 2B that show different perspective views of the gearbox 30, FIG. 2C that shows a cross-section of the gearbox 30 and FIGS. 3A and 3B that show, respectively, a perspective view of a housing body 40 of the gearbox 30 and a sectioned view of the housing body 40. The housing body 40 generally houses at least one gearset 42 (FIGS. 4A and 4B) within an internal cavity 44 of the housing body 40. The housing body 40 has a first flange 46 that defines a first plane 46a (FIG. 3B)

and a second flange 48 that defines a second plane 48*a* that is transverse, or at an angle, to the first plane 46*a*. As shown in FIG. 1, the gearbox 30 is secured to the turbine section 28 and the second flange 48 is secured to the generator section 26 through a strut 50. The gearbox 30 is mounted to the turbine section 28 by two bearings (not shown) inside the gearbox 30 that support a turbine shaft.

The housing body 40 extends around an axis A, which is also the axis of rotation of the turbine blades 28*a*. With regard to axis A, the housing body 40 includes a first axial end 52 and an opposite, second axial end 54 that are each open to the internal cavity 44 within the housing body 40. The housing body 40 further includes a radially-enlarged section 40*a* that at least partially defines an oil sump 56 within the internal cavity 44 of the housing body 40. That is, the radially-enlarged section 40*a* is hollow and defines an internal channel 40*b* that serves to store oil within the housing body 40 of the gearbox 30.

The housing body 40 is asymmetrical with regard to the radially-enlarged section 40*a* such that the radially-enlarged section 40*a* extends only partially circumferentially around the axis A. Thus, the channel 40*b* defined within the radially-enlarged section 40*a* also extends only partially circumferentially around the axis A. A portion of channel 40*b* is at the bottom of the gearbox 30 when in the stowed position and functions to store or hold oil in the oil sump 56.

The housing body 40 further includes a radially-indented section 40*c* that is directly adjacent the radially-enlarged section 40*a* (see FIG. 2B). The radially-indented section 40*c* defines a positive feature 40*d* (FIG. 3A) that extends within the oil sump 56. The radially indented section 40*c* also acts as a rib to stiffen the housing body 40. The positive feature 40*d* at least partially defines a protruding wall of the oil sump 56. Thus, the size of the indent of the radially-indented section 40*c* controls the size of the positive feature 40*d* within the internal cavity 44 of the housing body 40.

The size of the positive feature 40*d* can be tailored to control the deployed volumetric size of the oil sump 56 and control the oil height relative to the gearset 42. A minimum oil volume is desired to cool the gearset 42 and bearings, and oil height is important to lubricate the gearset 42 and allow the gearset 42 to splash lubricant to the rest of the gearbox 30. A relatively smaller radially-indented section 40*d* would increase the volume of the oil sump 56 and a relatively greater radially-indented section 40*d* would reduce the volume of the oil sump 56. Given the size constraints of a ram air turbine, the radially-indented section 40*d* and the radially-enlarged section 40*a* thus provide the ability to design the housing body 40 with a specific volumetric deployed size of the oil sump 56 and still be axially compact to fit within a required size envelope. In one example, the oil sump 56 has a volumetric size of approximately 5 cubic inches/82 cubic centimeters. It is to be understood, however, that the size of the radially-indented section 40*d* and the size of the radially-enlarged section 40*a* can be altered to tailor the volumetric size of the oil sump 56 as needed.

The housing body 40 further includes an oil fill passage 60 (FIG. 3A) for filling the oil sump 56 with oil for operation of the gearbox 30. The oil fill passage 60 extends between an inlet 62 (FIG. 2A) at an exterior of the housing body 40 and an outlet 64 at the oil sump 56. A drain passage 66 is also provided near the bottom of the oil sump 56 for removing or changing the oil in the gearbox 30 and a sight window 68 provides visual confirmation of the oil level (FIG. 2A).

Figure 4A:
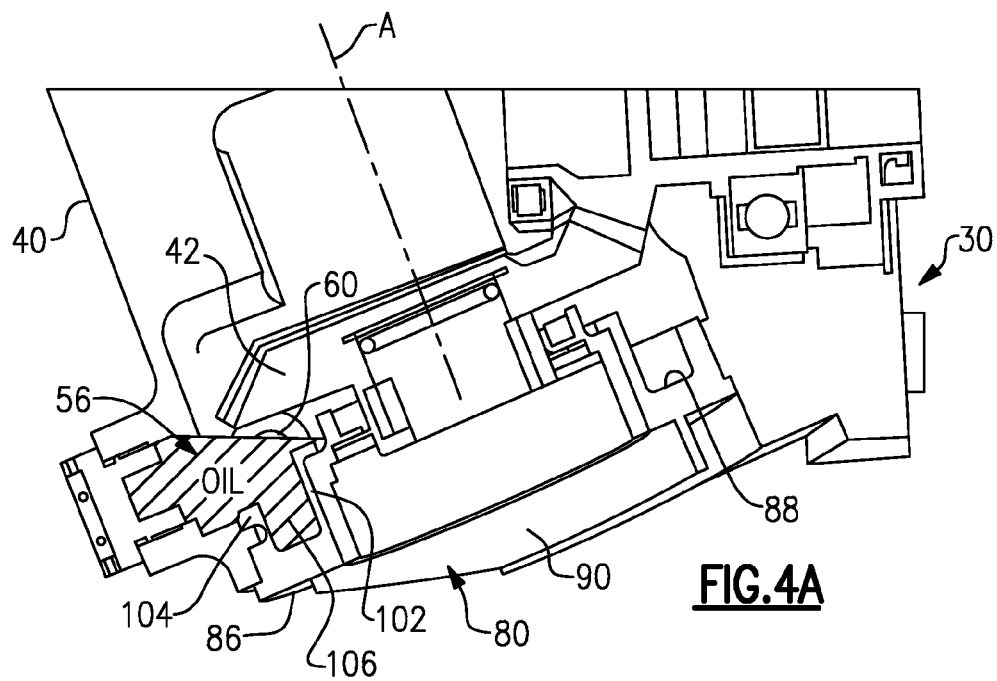
FIG. 4A illustrates a sectioned view of a gearbox of a ram air turbine in a stowed position.
Figure 4B:
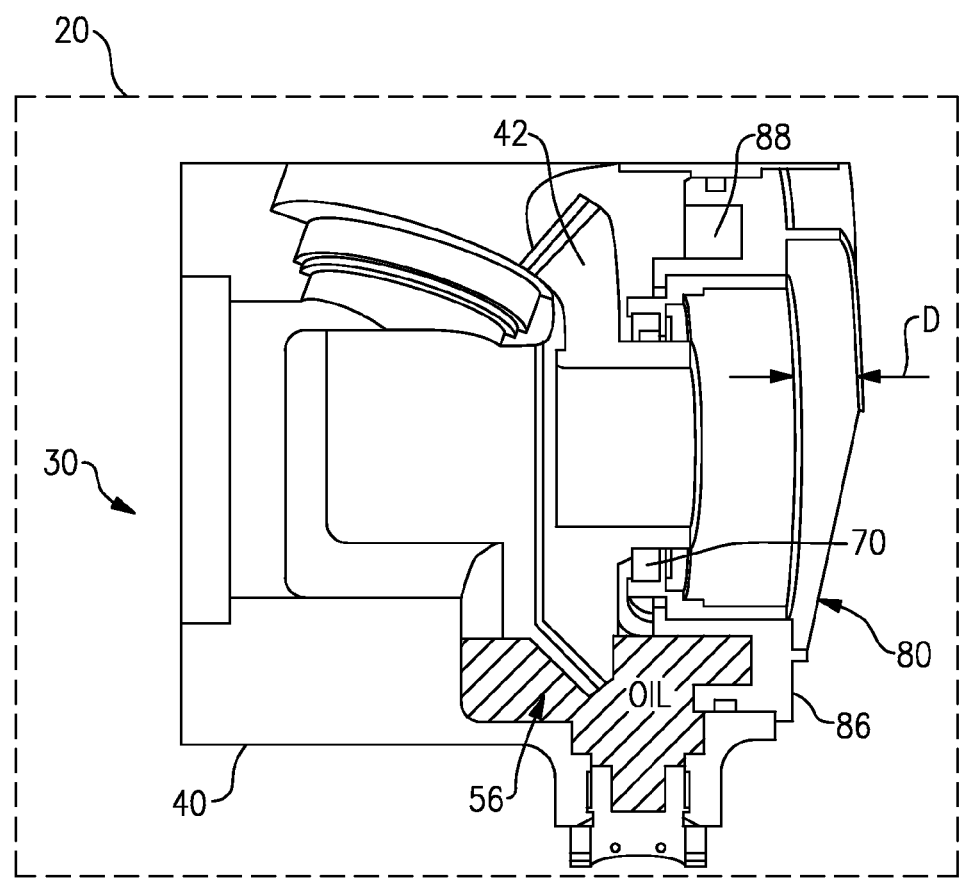
FIG. 4B illustrates a sectioned view of a gearbox of a ram air turbine in a deployed position.

As shown in FIGS. 4A and 4B, the oil fill passage 60 is located in the deployed position such that, when the ram air turbine 20 is in the stowed position (FIG. 4A), the oil volume in the oil sump 56 fills oil fill passage 60 without contacting gearset 42. In comparison, if an oil fill passage were at another location other than at the oil sump 56, the oil installed into the gearbox 30 could exceed a predetermined maximum amount of oil that is required to avoid oil contact with a gear in the stowed position. That is, the location of the oil fill passage 60 at the sump 56 precludes a greater amount of oil than necessary from being installed in to the gearbox 30 in the deployed position to meet this requirement. As shown in FIG. 4B, there is a sufficient amount of oil to contact the gearset 42 when the ram air turbine 20 pivots to the deployed position (see line 32 in FIG. 1). In general, the oil, which has an increased viscosity if cold, is kept off of the gearset 42 when the ram air turbine 20 is in the stowed position to prevent the oil from initially inhibiting movement of the gearset 42 once the ram air turbine 20 is deployed. The oil level in the stowed position is also designed to be below the level of a seal 70, to prevent inadvertent leakage and the inability to operate as needed if the seal 70 leaks.

Besides being axially compact, the housing body 40 of the gearbox 30 is also compact in thickness. As an example, the housing body 40 fits within a radial envelope between planes $P_1$ and $P_2$ (FIG. 3A) such that in all radial directions with regard to axis A, the housing body 40 is less than 6 inches/15.24 centimeters. That is, even the second flange 48 has a bolt pattern that is within the 6 inch/15.24 centimeter envelope. Furthermore, if the 6 inch/15.24 centimeter envelope is exceeded, the aircraft industry requires additional housing material strength testing. An example material used to make the housing body 40 is an aluminum alloy, such as 6061 aluminum per AMS4027. Per the Metallic Materials Properties Development and Standardization (MMPDS), which sets forth aircraft industry material standards, S basis properties are only available up to 6 inch raw material size. Material tests of larger raw material sizes has shown a reduction in fatigue properties. Because the housing body meets the 6 inch/15.24 centimeter envelope, the cost of the additional testing is avoided. Thus, the housing body 40 includes the features of the radially-enlarged section 40*a*, the radially-indented section 40*c* and the oil fill passage 60 located at a spill-to-fill location with regard to the oil sump 56, all packaged within this 6 inch envelope between planes $P_1$ and $P_2$.

Referring to FIGS. 2A and 2B, the second axial end 54 of the housing body 40 is generally open to the internal cavity 44 within the housing body 40 to serve several functions. In one aspect, the gearset 42 and other internal components may be installed through the second axial end 54 into the internal cavity 44. Subsequently, the second axial end 54 serves as an access location to the internal cavity 44 and as a mount for a test motor to test the operation of the gearbox 30. In this regard, the second axial end 54 includes a flange 54*a* that projects axially and includes a plurality of attachment bosses 54*b* for securing the test motor to the housing body 40. The flange 54*a* extends only partially circumferentially around the axis A to clear cover 80. The partial flange 54*a* reduces the weight and size envelope of the gearbox 30, and prevents the gearbox 30 from contacting adjacent aircraft structure.

Figure 5:
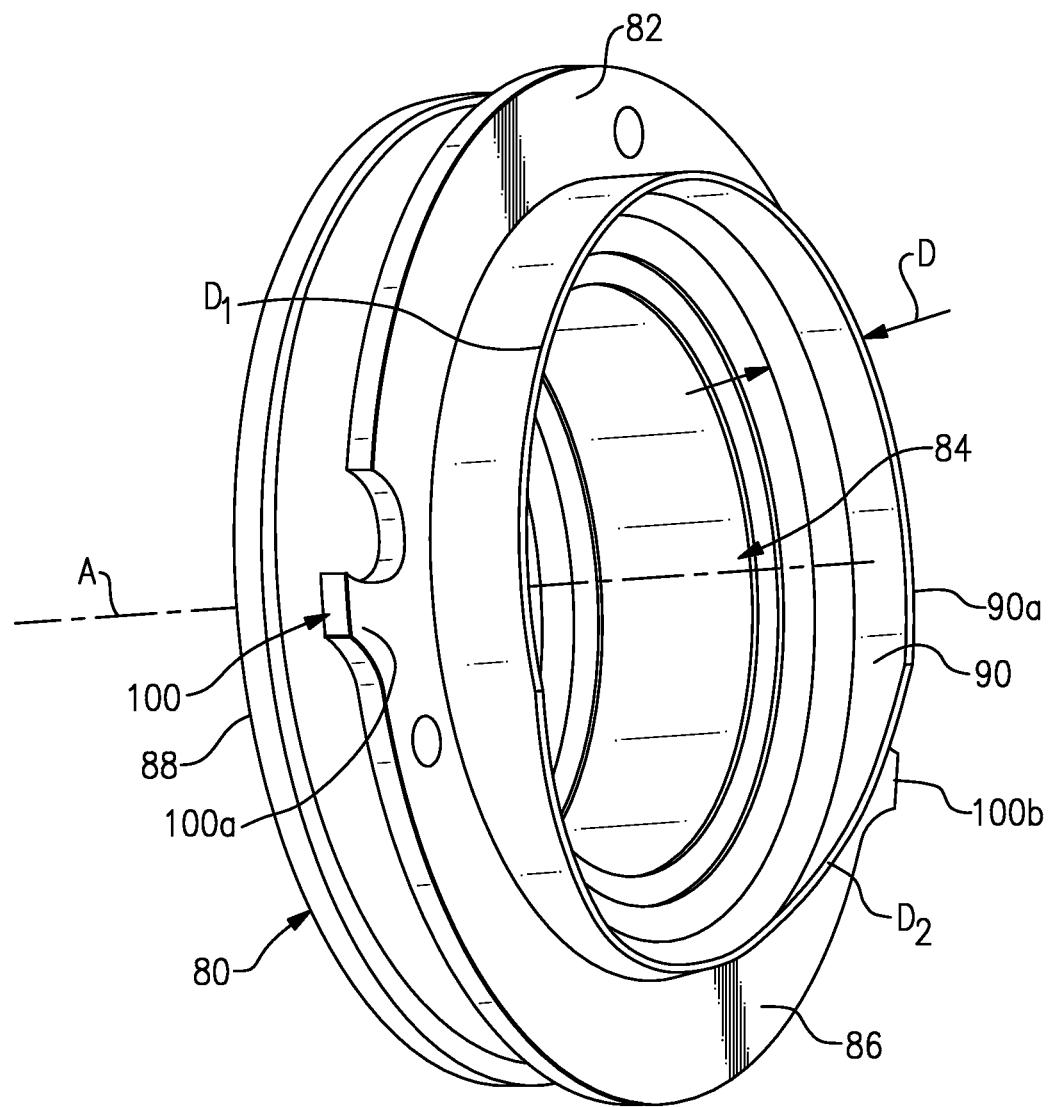
FIG. 5 illustrates a cover of a gearbox of a ram turbine engine.

Referring also to FIG. 5 that shows an isolated view of the annular cover 80, the annular cover 80 includes an annular body 82 that extends around a central opening 84 and between a first axial side 86 and a second axial side 88. In this example, the second axial side 88 faces inwardly toward the internal cavity 44 within the housing body 40. The first axial side 86 therefore faces outwardly, away from the internal cavity 44.

The annular body 82 includes a lip 90 that extends from the first axial side 86 to a free tip end 90*a*. The lip 90 thus defines an axial lip dimension D that is generally parallel to the axis A, which is also the central axis of the opening 84. The axial lip dimension D varies with respect to circumferential position around the axis A. Thus, the lip 90 has a first axial lip dimension D1 at a first circumferential location and a second axial lip dimension D2 at a second circumferential location that is less than the axial lip dimension D1. In this example, a circumferential section of the lip 90 from an 8 o'clock location to a 4 o'clock location relative to the axis A has a relatively uniform axial lip dimension D. The axial lip dimension D then gradually tapers down to a minimum axial lip dimension D at the 6 o'clock position. Thus, 60% of the circumference of the lip 90 has a uniform axial lip dimension D and the remaining 40% of the circumference has a reduced axial lip dimension D. The tapered section shown also contributes to the useful pilot circumference, so approximately 75% of useful pilot circumference is obtained. In further examples, 50-90% of the circumference of the lip 90 has a uniform axial lip dimension D and the remaining circumference has a reduced axial lip dimension D.

The lip 90 of the annular cover 80 serves as a pilot for mounting the test motor on the housing body 40 of the gearbox 30. When mounting the test motor, the lip 90 serves to guide and align the test motor with the axis A. In that regard, the lip 90 need not have a uniform axial lip dimension to serve this function. Further, the lip 90 also reduces the weight and size envelope of the gearbox 30 to clear adjacent aircraft structure. Ram Air Turbine (RAT) installations commonly have tight envelope restrictions from the gearbox end to the door, so this is a useful feature.

The annular cover 80 further includes an anti-rotation feature 100. In this example, the anti-rotation feature 100 includes a first radially-extending ear 100a and a second radially-extending ear 100b. The radially-extending ears 100a and 100b are generally offset by approximately 180°, although other offsets can alternatively be used. The radially-extending ears 100a and 100b abut the flange 54a at the second axial end 54 of the housing body 40. Thus, when the annular cover 80 is assembled onto the second axial end 54 of the housing body 40, the annular cover 80 is unable to rotate about axis A because the flange 54a serves as a rotational stop. In this regard, the radially-extending ears 100a and 100b and flange 54a also ensure proper orientation of the annular cover 80 when it is assembled into the gearbox 30. The anti-rotation feature 100 also resists rotational forces of moving parts within the gearbox 30, such as a bearing.

As shown in FIG. 4A, the second axial side 88 of the annular cover 80 includes a first axially extending wall 102 and a second axially extending wall 104 that is radially spaced apart from the first axial wall 102 to define a pocket 106 there between. The pocket 106 in this example is an annular channel. At least a portion of the pocket 106 defines a portion of the oil sump 56 such that when the ram air turbine 20 is in the stowed position, at least some of the oil is retained within the pocket 106.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A ram air turbine gearbox housing comprising:
a housing body including a first flange defining a first plane and a second flange defining a second plane that is transverse to the first plane, the housing body extending around an axis and having a first axial end and an opposite, second axial end that are each open to an internal cavity of the housing body, the housing body including a radially-enlarged section at least partially defining an oil sump within the internal cavity of the housing body, and a cover mounted at the second axial end, the cover including an annular body extending around a central opening and between a first axial side and a second axial side, the annular body including a lip extending from the first axial side to a free tip end to define an axial lip dimension, the axial lip dimension varying with respect to circumferential position around the central axis.

2. The ram air turbine gearbox housing as recited in claim 1, wherein the oil sump includes a channel extending partially circumferentially around the axis.

3. The ram air turbine gearbox housing as recited in claim 1, wherein the housing body includes a radially-indented section adjacent the radially-enlarged section.

4. The ram air turbine gearbox housing as recited in claim 3, wherein the radially-indented section defines a positive feature extending in the oil sump.

5. The ram air turbine gearbox housing as recited in claim 3, wherein the radially-indented section defines a rib on the housing body.

6. The ram air turbine gearbox housing as recited in claim 1, wherein the housing body includes an oil fill passage extending between an inlet that opens at an exterior of the housing body and an outlet that opens at the oil sump.

7. The ram air turbine gearbox housing as recited in claim 1, wherein a span of the housing body in all radial directions is no longer than 6 inches/15.24 centimeters.

8. The ram air turbine gearbox housing as recited in claim 1 wherein the second axial side of the annular cover at least partially defines the oil sump.

9. The ram air turbine gearbox housing as recited in claim 8, wherein the annular body includes on the second axial side a first axially-extending wall and a second axially-extending wall that is radially spaced apart from the first axially-extending wall to define a pocket there between.

10. The ram air turbine gearbox housing as recited in claim 1, wherein the annular body includes a first radially-extending ear and a second radially-extending ear.

11. The ram air turbine gearbox housing as recited in claim 1, wherein the lip extends circumferentially around the central axis, and 50-90% of the circumference of the lip has a uniform axial lip dimension and the remaining circumference has a reduced axial lip dimension.

12. The ram air turbine gearbox housing as recited in claim 1, wherein the housing body also includes an oil fill passage at the oil sump, the oil fill passage having a location with respect to a stowed position that precludes installation of an amount of oil that exceeds a predetermined maximum amount that is necessary to avoid contact with the at least one gear in the stowed position.

13. A ram air turbine gearbox comprising:
a housing body including a first flange defining a first plane and a second flange defining a second plane that is transverse to the first plane, the housing body extending around an axis and having a first axial end and an opposite, second axial end that are each open to an internal cavity of the housing body, the housing body including a radially-enlarged section at least partially defining an oil sump within the internal cavity of the housing body;

at least one gear mounted within the housing body, the housing body also including an oil fill passage at the oil sump, the oil fill passage having a location with respect to a stowed position that precludes installation of an amount of oil in the oil sump that exceeds a predetermined maximum amount that avoids contact of the oil with the at least one gear in the stowed position; and a cover mounted at the second axial end, the cover including an annular body extending around a central opening and between a first axial side and a second axial side, the annular body including a lip extending from the first axial side to a free tip end to define an axial lip dimension, the axial lip dimension varying with respect to circumferential position around the central axis.

14. The ram air turbine gearbox as recited in claim 13, wherein the oil sump includes a drain passage therein to an exterior of the housing body.

15. A ram air turbine comprising:
a generator section;
a turbine section movable between a deployed position and a stowed position; and
a gearbox coupled to the turbine section such that the turbine section is operable to drive the generator section through the gearbox, the gearbox including a housing body comprising a first flange defining a first plane and a second flange defining a second plane that is transverse to the first plane, the housing body extending around an axis and having a first axial end and an opposite, second axial end that are each open to an internal cavity of the housing body, the housing body including a radially-enlarged section at least partially defining an oil sump within the internal cavity of the housing body, and a cover mounted at the second axial end, the cover including an annular body extending around a central opening and between a first axial side and a second axial side, the annular body including a lip extending from the first axial side to a free tip end to define an axial lip dimension, the axial lip dimension varying with respect to circumferential position around the central axis.

16. The ram air turbine as recited in claim 15, wherein the housing body includes an oil fill passage extending between an inlet that opens at an exterior of the housing body and an outlet that opens at the oil sump.

17. The ram air turbine as recited in claim 16, wherein in the stowed position, the oil fill passage is located such that oil in the oil sump will spill from the oil fill passage before the oil in the oil sump contacts the at least one gear.

18. The ram air turbine as recited in claim 15, wherein the housing body also includes an oil fill passage at the oil sump, the oil fill passage having a location with respect to a stowed position that precludes installation of an amount of oil that exceeds a predetermined maximum amount that is necessary to avoid contact with the at least one gear in the stowed position.

19. A method of installing a gearbox on a ram air turbine, the method comprising:
providing a gearbox comprising a housing body including a first flange defining a first plane and a second flange defining a second plane that is transverse to the first plane, the housing body extending around an axis and having a first axial end and an opposite, second axial end that are each open to an internal cavity of the housing body, the housing body including a radially-enlarged section defining an oil sump within the internal cavity of the housing body;
securing the housing body to a turbine section;
securing the second flange to at least one of a strut and a generator section; and
securing a cover on the second axial end, the cover including an annular body extending around a central opening in between a first axial side and a second axial side with regard to the central axis of the opening, the annular body including a lip extending from the first axial side to a free tip end to define an axial lip dimension, the axial lip dimension varying with respect to circumferential position around the central axis.

20. The method as recited in claim 19, including providing the housing body with a span of in all radial directions is no longer than 6 inches/15.24 centimeters to avoid industry-required strength testing.

* * * * *